United States Patent
Roth et al.

(10) Patent No.: US 8,944,521 B2
(45) Date of Patent: Feb. 3, 2015

(54) WHEEL WEIGHT ASSEMBLY

(75) Inventors: Jonathan T. Roth, Waverly, IA (US); David J. Easton, Cedar Falls, IA (US); Ronald A. Martin, Cedar Falls, IA (US); Timothy W. Biederman, Osage, IA (US)

(73) Assignee: Deere & Company, Moline, IL (US)

( * ) Notice: Subject to any disclaimer, the term of this patent is extended or adjusted under 35 U.S.C. 154(b) by 323 days.

(21) Appl. No.: 13/530,299

(22) Filed: Jun. 22, 2012

(65) Prior Publication Data

US 2013/0342002 A1  Dec. 26, 2013

(51) Int. Cl.
B60B 15/28 (2006.01)

(52) U.S. Cl.
USPC ........................................................ 301/53.5

(58) Field of Classification Search
CPC ...................................................... B60B 15/28
USPC ................. 301/53.5, 41.1; 280/755, 758, 759
See application file for complete search history.

(56) References Cited

U.S. PATENT DOCUMENTS

| | | | |
|---|---|---|---|
| 2,150,107 A | 3/1939 | Shields | |
| 2,699,362 A | 1/1955 | Sawyer et al. | |
| 2,859,065 A * | 11/1958 | Darby | 301/53.5 |
| 2,988,401 A | 6/1961 | Matz | |
| 3,314,728 A | 4/1967 | Cross | |
| 3,736,946 A * | 6/1973 | Yando et al. | 132/73 |
| 3,774,970 A * | 11/1973 | Murphy et al. | 301/53.5 |
| 5,116,106 A * | 5/1992 | Hardesty et al. | 301/53.5 |
| 6,132,007 A | 10/2000 | Harmsen | |
| 6,283,556 B1 * | 9/2001 | Taylor | 301/53.5 |
| 7,182,409 B2 * | 2/2007 | Thomas et al. | 301/53.5 |

FOREIGN PATENT DOCUMENTS

| | | |
|---|---|---|
| DE | 1279496 B | 10/1968 |
| EP | 2033808 | 3/2009 |
| GB | 2452531 | 9/2007 |
| JP | S57158502 U | 10/1982 |
| JP | S59179702 U | 12/1984 |

OTHER PUBLICATIONS

European Search Report, dated Oct. 7, 2013 (10 pages).
Wheel weights on John Deere tractors sketchs (2 pages).
Fendt 936 Vario 42 in wt. and Fendt Parts book 1000kg 300kg (2 pages).

* cited by examiner

*Primary Examiner* — S. Joseph Morano
*Assistant Examiner* — Jean Charleston

(57) ABSTRACT

A wheel weight assembly mounts to a vehicle wheel disk section. The wheel weight assembly includes an annular starter weight mounted to the wheel disk section. The starter weight has mounting bores extending therethrough and centering taps projecting therefrom. The assembly also includes threaded members, nut members, an outer weight and attaching bolts. The starter weight includes a plurality of depressions. Each depression receives and prevents rotation of a nut member. Each threaded member extends through a corresponding one of the mounting bores and into a corresponding one of the nut members. The outer weight has attaching bores and centering recesses which receives the centering tabs. Each attaching bolt extends through a corresponding one of the attaching bores and is threadably received by a corresponding one of the nut members.

8 Claims, 5 Drawing Sheets

WHEEL WEIGHT ASSEMBLY

FIELD OF THE INVENTION

The present disclosure relates to a wheel weight assembly, and in particular to a weight assembly used in agricultural tractors or similar vehicles.

BACKGROUND OF THE INVENTION

Wheel weight assemblies are used in agricultural tractors or similar vehicles. Some such wheel weight assemblies are time consuming and difficult to mount. Some such assemblies include long bolts. These bolts must be inserted through holes in the wheel from the inside so that the bolt shanks which extend outwardly from the rim droop downwardly by gravity. It is very difficult to slip the holes in the weights over the bolts, because the heavy weight must be lifted and held in place while the holes are aligned with the bolts.

Another commercially available wheel weight assembly includes one or two weights which are attached to the wheel using a stud-type bolt that protrudes through the wheel and then through the weight. Successive weights are attached to the previous weights using bolts. This makes weight removal time consuming and re-torquing difficult.

Another wheel weight assembly is described in UK patent application GB 2452531A. This design requires removable centering cones in order to position an outer weight relative to an inner weight.

It would be desirable to provide a wheel weight assembly wherein the outer weight is centered on members which are integral to the starter weight, not removable members. It would also be desirable to provide a wheel weight assembly wherein the outer weight and inner weight use a common set of bolts. Such an assembly should not interfere with the attachment or detachment of the vehicle wheel. Such an assembly should also be easy to attach and economical to produce. Such an assembly should also allow for a large variance in the amount of weight attached to the wheel.

SUMMARY

According to an aspect of the present disclosure, a wheel weight assembly is provided for attachment to the wheel of a tractor or other vehicle. The assembly includes a starter weight, a large outer weight, and which allows for removal of the outer weight without removal of the starter weight. The starter weight mounts directly to the outboard side of the wheel center disk using bolts and long nuts. The geometry of the starter weight includes centering features that protrude outward from the starter weight and allow the large outer weight to easily be centered on the starter weight. The outer weight is attached using bolts threading into the same long nuts as the starter weight bolts. Thus, the outer weight is connected directly to the hardware which also holds the starter weight to the wheel disk. This increases the ease of weight removal and re-torquing.

DETAILED DESCRIPTION OF THE DRAWINGS

Figure 1:
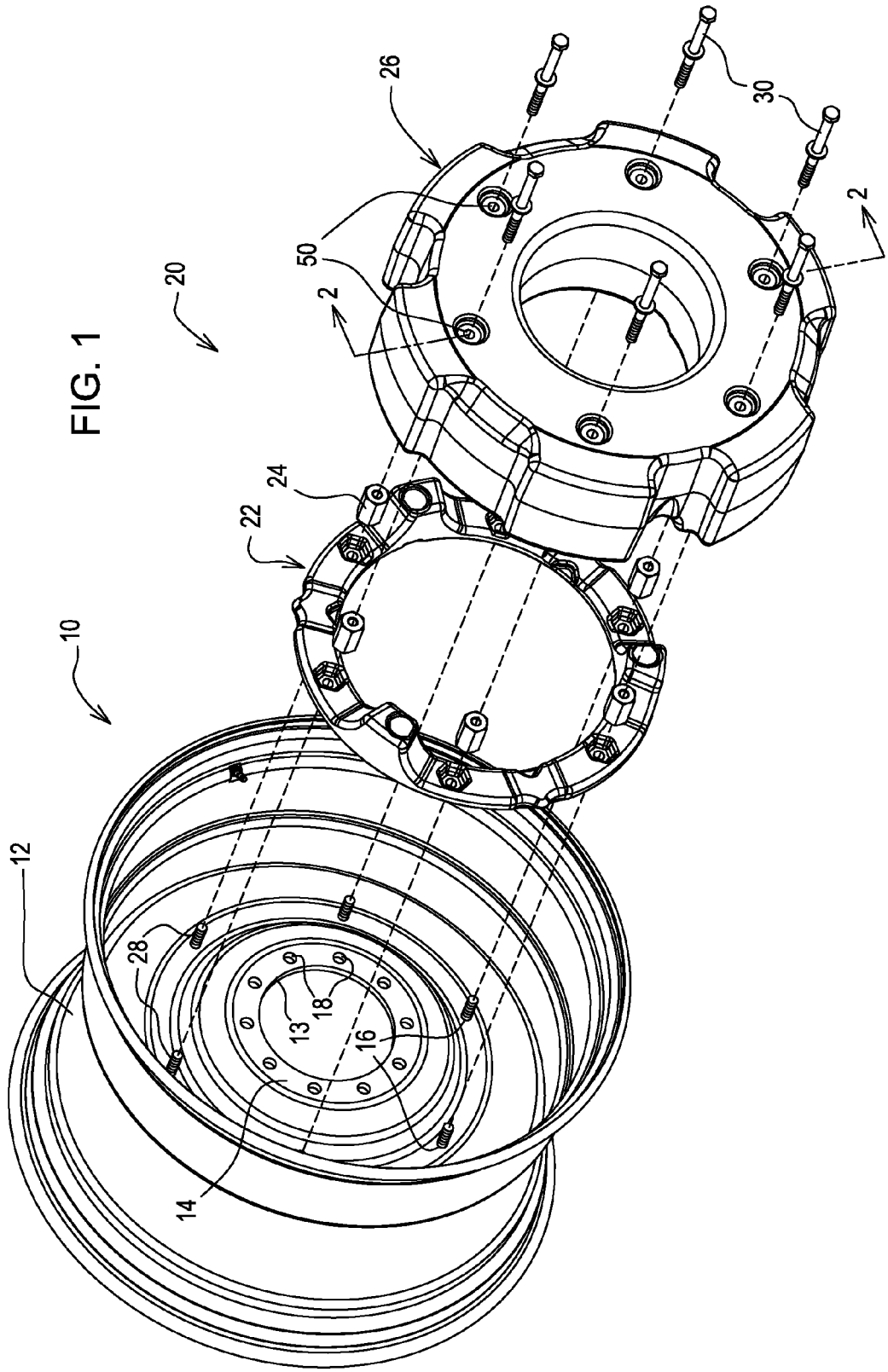
FIG. 1 is an exploded perspective view of a wheel weight assembly embodying the invention.
Figure 2:
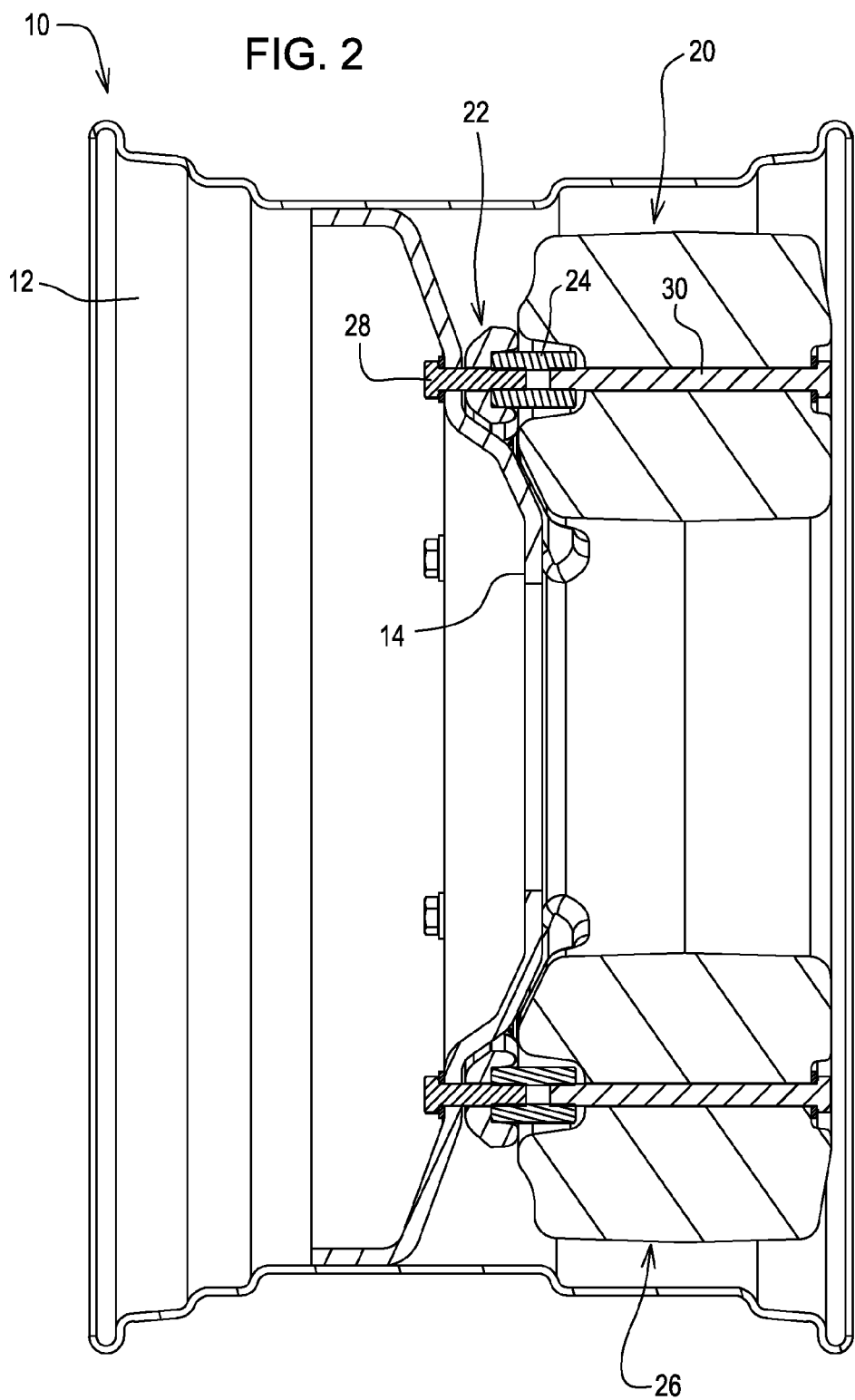
FIG. 2 is a sectional view of the assembly of FIG. 1.
Figure 3:
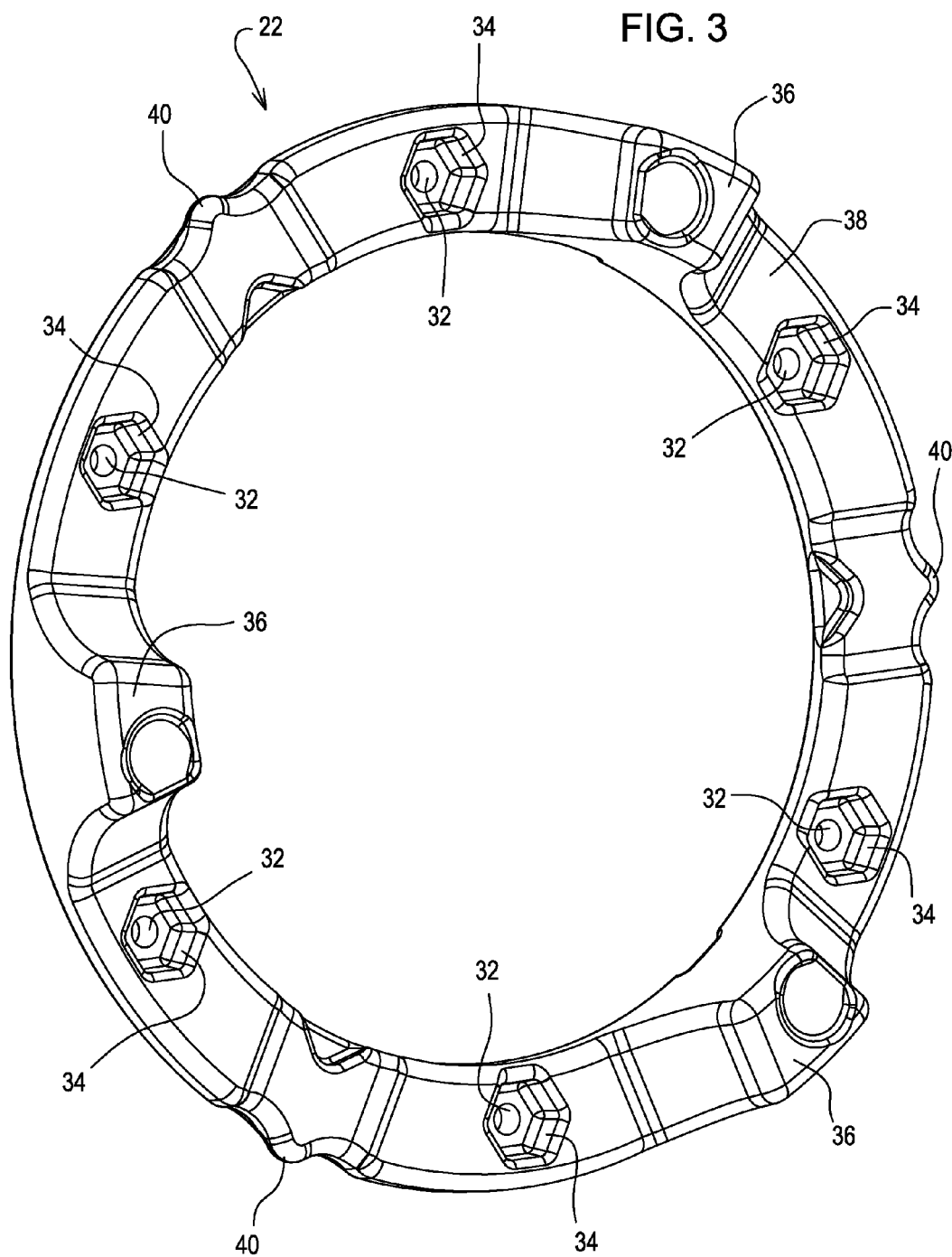
FIG. 3 is a perspective view of the outer side of the starter weight of FIG. 1.
Figure 4:
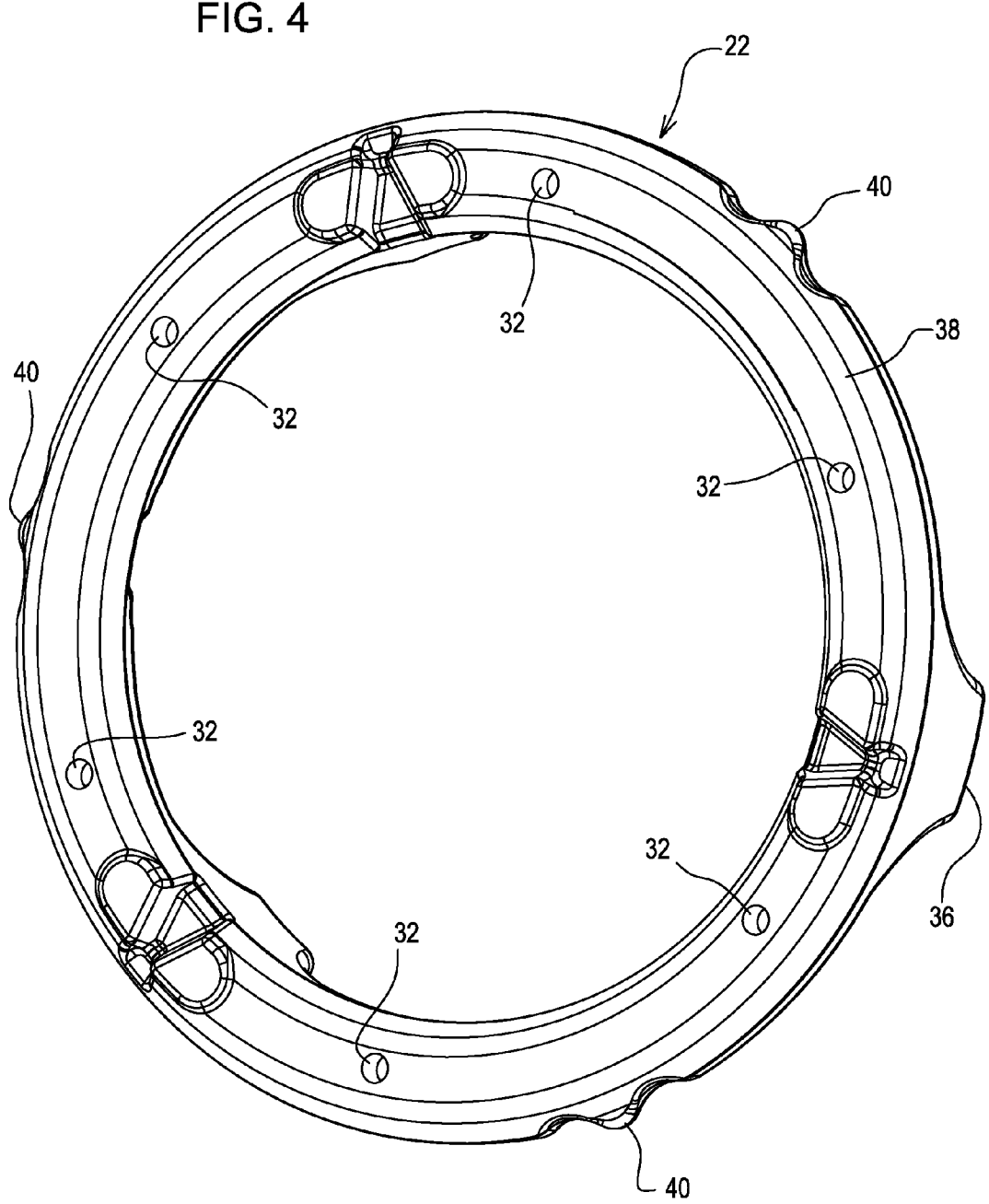
FIG. 4 is a perspective view of the inner side of the starter weight of FIG. 1.

Referring to FIGS. 1 and 2, a vehicle wheel 10 includes a rim 12 and a central disk section 14. A pneumatic tire (not shown) mounts on the rim 12 as is well known in the art. The central disk section 14 includes a central opening 13, and inner set of hub mounting holes 15 and an outer set of weight mounting of holes 16. A wheel weight assembly 20 includes an annular inner or starter weight 22, a set of nut members 24, an outer weight 26, a set of inner bolts 28 and a set of outer bolts 30.

Referring now to FIGS. 1, 2, 3 and 4, the starter weight 22 is annular and is mounted in contact with the wheel disk section 14. The starter weight 22 has a plurality of mounting bores 32 extending axially therethrough. Bores 32 are aligned with the bores 16 of the wheel disk 14. Surrounding each bore 32 is an axially outwardly opening polygonal-shaped, preferably hexagonal or 6-sided, recess or pocket 34. A plurality of spaced apart centering tabs 36 project axially outwardly from a main body 38 of the starter weight 22. A plurality of spaced apart bumps 40 project radially outwardly from the body 38. These bumps 40 can be used to help align the outer weight 26 with the starter weight 22. Each bore 32 is machined through the center of each of the 6 pockets 34.

A nut member 24 is received by each of the recesses 34. Each nut member has a polygonal-shaped, preferably hexagonal, outer surface which matches the shape of the recess 34. Each nut member 24 is hollow and is threaded internally. The starter weight 22 is mounted to the wheel disk 14 by bolts 28 which extend through the wheel disk 14, through the starter weight 22 and which are threadably received by the nut members 24. As a result, the nut members 24 are positioned between the starter weight 22 and the outer weight 26.

Figure 5:
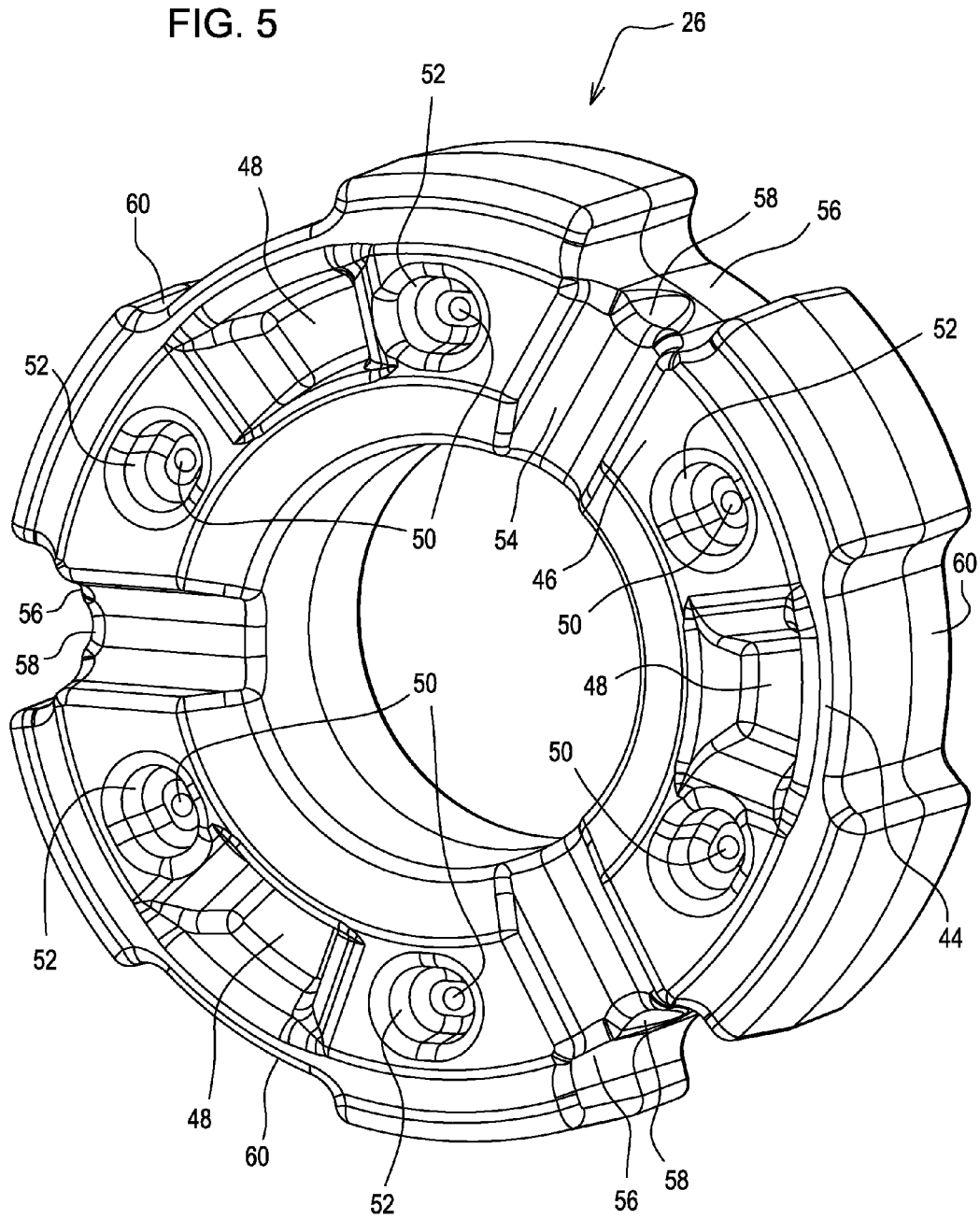
FIG. 5 is a perspective view of the inner side of the outer weight of FIG. 1.

Referring now to FIGS. 1 and 5, the outer weight 26 has a hollow annular body 44. The inner side 46 of the body 44 includes a plurality of centering recesses 48, each of which receives a corresponding one of the centering tabs 36 and which has a shape which is complementary to the shape of the tabs 36. The outer weight 26 has a plurality of mounting bores 50 extending axially therethrough. Bores 50 are aligned with the bores 32 of the starter weight 22. The inner side 46 of the body 44 also includes a plurality of recesses 52, each of which surrounds a corresponding one of the bores 50. Each recess 52 is adapted to receive an outer portion of a corresponding one of the nut members 24. The outer weight 26 is preferably larger and heavier than the starter weight 22.

The outer weight 26 is a doughnut shaped casting, and the centering recesses 48 have drafted sides which help with the centering of the outer weight 26 against the starter weight 22.

The inner side 46 of the body 44 also includes a plurality of radially extending inwardly facing slots 54 which allow a user to wrap a chain (not shown) around the weight 26 when removing it from the wheel 10.

The outer peripheral surface of the body 44 includes a plurality of large notches 56 for accessing the chain hole (not shown) in the rim and smaller notches 58 which may be used for alignment purposes. The outer surface of the body 44 also includes a plurality of shallow recesses 60 which are provided for valve stem clearance.

Each of the outer bolts 30 extends through the mounting bores 50 of the outer weight 26 and is threadably received by a corresponding one of the nut members 24. Thus, each inner bolt 28 cooperates with a nut member 24 and an outer bolt 30 to hold both the starter weight 22 and the outer weight 26 to the wheel disk 14. Preferably, the starter weight 22 and the outer weight 30 are mounted only on one side of the wheel disk section 14.

With this assembly 20, it is possible to re-torque or re-tighten all of the threaded connections between the nut members 24 and the bolts 28 and 30 without removing the outer weight 26. The larger outer weight 26 can be easily removed without removing the starter weight 22. The assembly 20 maintains compatibility with current wheel configurations. The wheel 10 can be removed from the hub (not shown) without requiring removal of the starter weight 22.

The starter weight 22 is a casting which has a doughnut shape. The three large centering tabs 36 are large enough to resist breakage from contact with the outer weight 26. The centering tabs 36 are also drafted and specifically matched with the outer weight 26 so that the outer weight 26 does not move under rapid deceleration or acceleration.

The starter weight 22 is attached to the wheel center disk 14 using the six bolts 28 that are inserted into the six weight attachment holes 16 in the wheel center disk 14 from the inboard side of the disk 14. After passing through the wheel center disk 14, the bolts 28 are passed through the starter weight 22 and into the extra-tall nuts 24. The nuts 24 are kept from rotating due to the hexagonal pockets 34 in the starter weight 22. Under normal operation with no outer weight attached, this joint can be re-tightened by tightening the bolt 28 on the inboard side of the wheel 10.

After placing the outer weight 26 onto the starter weight 22, the outer weight 26 is attached to the starter weight 22 using the six bolts 30. The bolts 30 first pass through the six bores 50 in the outer weight 26 and then thread into the long nuts 24, on the outer ends of the starter weight attachment bolts 28. The long nuts 24 are still constrained from rotation by the hexagonal recesses 34 in the starter weight 22.

As an alternative to the hexagonal pockets which prevent rotation of the nut members 24, a different locking feature could be used. For example, a separate component could be used to prevent the nuts 24 from rotating, such as a steel plate (not shown) with hexagonal holes (not shown) and a circular hole. The hexagonal hole would receive each nut member 24 and the circular hole would receive a bolt (not shown) to hold the plate to the starter weight 22.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A wheel weight assembly for mounting to a vehicle wheel having a wheel disk section having a plurality of holes therethrough, the wheel weight assembly comprising:
an annular starter weight mounted in contact with the wheel disk section, the starter weight having a plurality of mounting bores extending axially therethrough;
a plurality of threaded members, each extending through one of the holes and a corresponding one of the mounting bores;
a plurality of nut members, each nut member threadably receiving a corresponding one of the threaded members and holding the starter weight to the wheel disc section;
an outer weight having a plurality of attaching bores extending axially therethrough and having a plurality of recesses, each of the recesses receiving a corresponding one of the nut members; and
a plurality of attaching bolts, each attaching bolt extending through a corresponding one of the attaching bores and being threadably received by a corresponding one of the nut members.

2. The wheel weight assembly of claim 1, wherein:
the starter weight and the outer weight are mounted only on one side of the wheel disk section.

3. The wheel weight assembly of claim 1, wherein:
the starter weight includes a plurality of depressions, each depression receiving an end of a corresponding one of the nut members and preventing rotation of the nut member.

4. The wheel weight assembly of claim 1, wherein:
the starter weight includes at least one axially projecting tab; and
the outer weight includes at least one depression, each depression receiving a corresponding tab.

5. The wheel weight assembly of claim 1, wherein:
the nut members are positioned between the starter weight and the outer weight.

6. The wheel weight assembly of claim 1, wherein:
the outer weight is heavier than the starter weight.

7. A wheel weight assembly for use on a vehicle wheel having a wheel disk section, the wheel weight assembly comprising:
an annular starter weight mounted to the wheel disk section, the starter weight having a plurality of mounting bores extending axially therethrough, the starter weight includes a plurality of polygonal-shaped depressions, the starter weight having a centering tab projecting therefrom;
a plurality of nut members, each nut member being received by a corresponding one of the depressions, which prevents rotation of the nut member;
a plurality of threaded members, each threaded member extending through a corresponding one of the mounting bores and into a corresponding one of the nut members;
an outer weight having a plurality of attaching bores extending axially therethrough, the outer weight having a centering recess which receives the centering tab; and
a plurality of attaching bolts, each attaching bolt extending through a corresponding one of the attaching bores and being threadably received by a corresponding one of the nut members.

8. The wheel weight assembly of claim 7, wherein:
the outer weight has a plurality of recesses, each of the recesses receiving a corresponding one of the nut members.

* * * * *